(12) United States Patent
Fisher et al.

(10) Patent No.: US 7,107,133 B2
(45) Date of Patent: Sep. 12, 2006

(54) SIMULATED AIRBAG SQUIB INTERFACE

(75) Inventors: John Fisher, Tampa, FL (US); Tex Monroe, Deltona, FL (US)

(73) Assignee: Key Safety Systems, Inc., Sterling Heights, MI (US)

( * ) Notice: Subject to any disclaimer, the term of this patent is extended or adjusted under 35 U.S.C. 154(b) by 315 days.

(21) Appl. No.: 10/853,263

(22) Filed: May 26, 2004

(65) Prior Publication Data

US 2005/0267662 A1 Dec. 1, 2005

(51) Int. Cl.
*B60R 22/00* (2006.01)
*B60R 21/16* (2006.01)

(52) U.S. Cl. .................................... 701/45; 280/735

(58) Field of Classification Search ................ 701/45, 701/46, 47; 280/728.1–735
See application file for complete search history.

(56) References Cited

U.S. PATENT DOCUMENTS

| | | | | |
|---|---|---|---|---|
| 5,187,465 A * | 2/1993 | Stonerook et al. | | 340/438 |
| 5,624,132 A | 4/1997 | Blackburn et al. | | 280/735 |
| 5,865,463 A | 2/1999 | Gagnon et al. | | 280/735 |
| 6,043,566 A * | 3/2000 | Bryant et al. | | 280/735 |
| 6,166,451 A | 12/2000 | Pigott | | |
| 6,185,488 B1 * | 2/2001 | Nomoto | | 701/29 |
| 6,300,764 B1 * | 10/2001 | Kelley | | 324/502 |
| 6,728,616 B1 * | 4/2004 | Tabe | | 701/45 |
| 2002/0153189 A1 * | 10/2002 | Young | | 180/268 |
| 2004/0045757 A1 | 3/2004 | Midorikawa et al. | | |

OTHER PUBLICATIONS

Fairchild Semiconductor™ 2n7000 / 2N7002 / NDS7002A N-Channel Enhancement Mode Field Effect Transistor, company brochure, Nov. 1995, 2 pp.
Vishay Semiconductors BZT52 Series Zener Diodes, company flyer, Jul. 1, 2003, 1 p.
Fairchild Semiconductor® General Purpose 6-Pin Phototransistor Optocouplers, company brochure, May 7, 2003, 3 pp.
"Blinky": LED driver makes simple IDE DMA detector, by Mike Stember, website printout http://216.239.39.104/search?q=cache:rnkCtoBjEbEj:www.national.com/nationaledge/au . . . Mar. 23, 2004, 2 pp.
Fairchild Semiconductor™ NDT3055L N-Channel Logic Level Enhancement Mode Field Effect Transitor, company brochure, Aug. 1998, 5 pp.
Tentative Toshiba Photocoupler GaAlAs Ired & Photo-Diode Array TLP191B, company brochure, Sep. 25, 2002, 4 pp.

* cited by examiner

*Primary Examiner*—Matthew Luu
(74) *Attorney, Agent, or Firm*—Lonnie Drayer; Patrick Stiennon

(57) ABSTRACT

An electronic circuit connects to an airbag crash controller in a way which is functionally identical to an airbag squib. Based on a squib fire signal from the controller, the circuit provides an activation signal indicating airbag deployment and also allows communication with an airbag crash controller by creating an open circuit that is detected by the airbag crash controller as an airbag fault. Each functional part of the circuit includes an isolator to protect the airbag crash controller.

5 Claims, 3 Drawing Sheets

SIMULATED AIRBAG SQUIB INTERFACE

FIELD OF THE INVENTION

The present invention relates to airbags and other safety systems which are deployed by firing a squib, airbag deployment controllers, and sensors which monitor airbag deployment.

BACKGROUND OF THE INVENTION

Airbags, particularly combined with seatbelts, have been widely used in automobiles to increase vehicle occupant safety. One approach to improving airbag deployment is to use a sensor to monitor airbag deployment and, depending on certain detected conditions, such as, for example, the airbag prematurely impacting with an object, venting the airbag. Using such a sensor in combination with an airbag to control airbag deployment is a distinct departure from typical past practices where sensors and logic are future looking in order to assess whether and with what force level an airbag should be deployed. Once the decision to deploy and the deployment level are decided by a conventional airbag deployment system, one or more squibs are fired and the airbag deploys.

Technology solutions that integrate one or more sensors that can control venting of the airbag during airbag deployment present a problem in interfacing with conventional design airbag crash controllers. In a typical airbag the only electronic component is the squib initiator. The airbag crash controller performs periodic built-in tests on the squib or squibs associated with the airbag to determine that the nominal resistance of the squib is still within specified limits. Such testing is typically performed at least each time the vehicle is started, and, if an airbag squib resistance is outside the specified limits, the vehicle operator is notified of a fault, and advised to seek maintenance. The airbag crash controller during a crash provides an initiation pulse of energy that activates the squib and deploys the airbag. Deployment sensors with their electronics, logic, and control functions, provide a whole new level of functionality that a conventional airbag crash controller is not designed to test or to function with.

Furthermore, with a conventional airbag module, the interface between the airbag crash controller and the airbag module consists of the two basic functions of resistance checking and initiation pulse, which allows independent design and even procurement of different airbag modules used with the same controller or even in the same vehicle model.

What is needed is a way of adding the functionality of an airbag deployment sensor and controlled venting to an airbag module while preserving the simplicity of the existing interface with the airbag crash controller.

SUMMARY OF THE INVENTION

The electronic circuit of the present invention connects to an airbag crash controller in a way that is functionally identical to an airbag squib and allows an airbag deployment sensor controller or system logic to receive from the airbag crash controller an activation signal indicating that airbag deployment is begun. The same circuit also allows an airbag deployment sensor controller to perform the built-in tests and to communicate the failure of such internal tests to the airbag crash controller by creating an open circuit that is detected by the airbag crash controller as an airbag squib which is outside nominal parameters indicating a fault. The circuit of the present invention performs two functions: providing an activation signal, to an airbag deployment sensor controller or other device, and reporting a circuit fault to the airbag crash controller. The circuit of the present invention isolates any airbag deployment sensor controller and fault determination circuitry from squib control wires coming from the airbag crash controller.

The circuit of the present invention has a first field effect transistor with a low $R_{DS}$ (on) (i.e., a low resistance signal path) in series with a two ohm load. When the field effect transistor is turned on, the airbag crash controller sees the two ohm resistance across a pair of lines used for squib initiation. When the field effect transistor is turned off, the airbag crash controller sees an open circuit across the squib control lines and so indicates an airbag fault to the vehicle operator. The field effect transistor is controlled and powered by a photovoltaic isolator which transmits power to the gate of the field effect transistor connecting the two ohm load across the squib control lines. The power side of the photovoltaic isolator is supplied by a control signal to a gate of a second field effect transistor which has a very high transconductance and low input current leakage. Control of the second field effect transistor is by means of an airbag sensor controller or controller logic.

An initiation signal for an airbag sensor controller is provided by a light-emitting diode in parallel with the two ohm load. The light-emitting diode drives a phototransistor, and the light-emitting diode and phototransistor form an optical isolator. The phototransistor of the optical isolator, in the presence of a signal from the light-emitting diode, pulls an output line low, indicating that the airbag crash controller has sent an initiation current along the squib initiation control lines. A zener diode is also connected in parallel with the two ohm load limiting the variation in current applied to the light-emitting diode.

An alternative circuit for controlling the first field effect transistor in series with a two ohm load, utilizes a 100 kHz frequency control signal from the airbag sensor controller or controller logic. The medium frequency control signal is amplified and applied to one side of a ferrite transformer. On the other side of the transformer a diode creates direct current which is applied to the base of the first field effect transistor, turning it on.

It is a feature of the present invention to provide an electrical circuit that can be used to obtain an isolated start signal from an airbag crash controller, and which can be used to communicate a fault condition to the airbag crash controller.

It is a further feature of the present invention to provide an electrical circuit that appears to an airbag crash controller as an airbag initiation squib.

It is another feature the present invention to provide an interface between an airbag deployment sensor and an airbag crash controller that provides electrical isolation between the controller of the airbag deployment sensor and the airbag crash controller that allow the airbag deployment sensor to communicate operational status to the airbag crash controller, and that allows the airbag deployment sensor to receive an airbag initiation signal from the airbag crash controller.

Further features and advantages of the invention will be apparent from the following detailed description when taken in conjunction with the accompanying drawings.

DETAILED DESCRIPTION OF THE INVENTION

Figure 1:
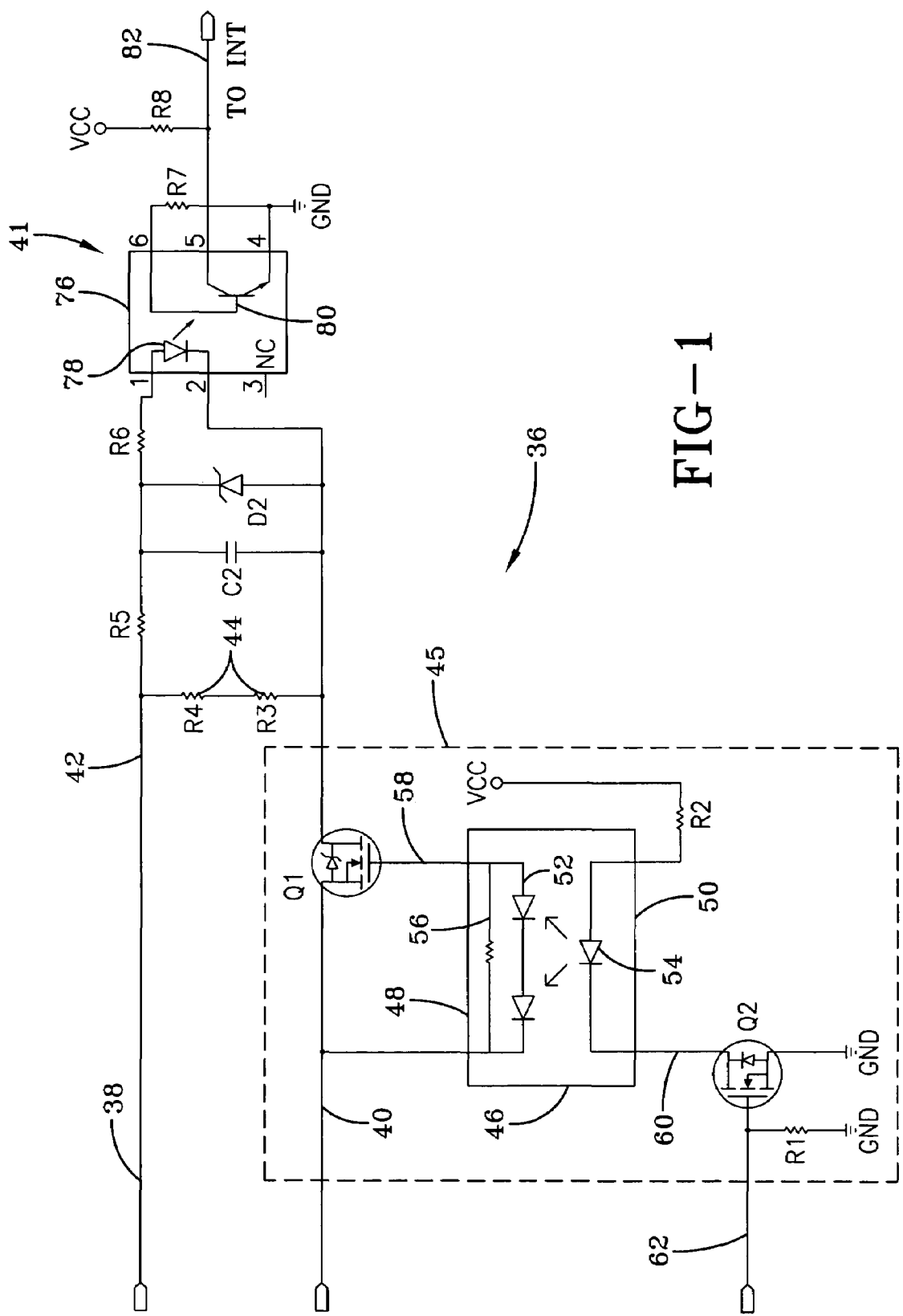
FIG. 1 is a schematic view of the circuit of this invention.
Figure 2:
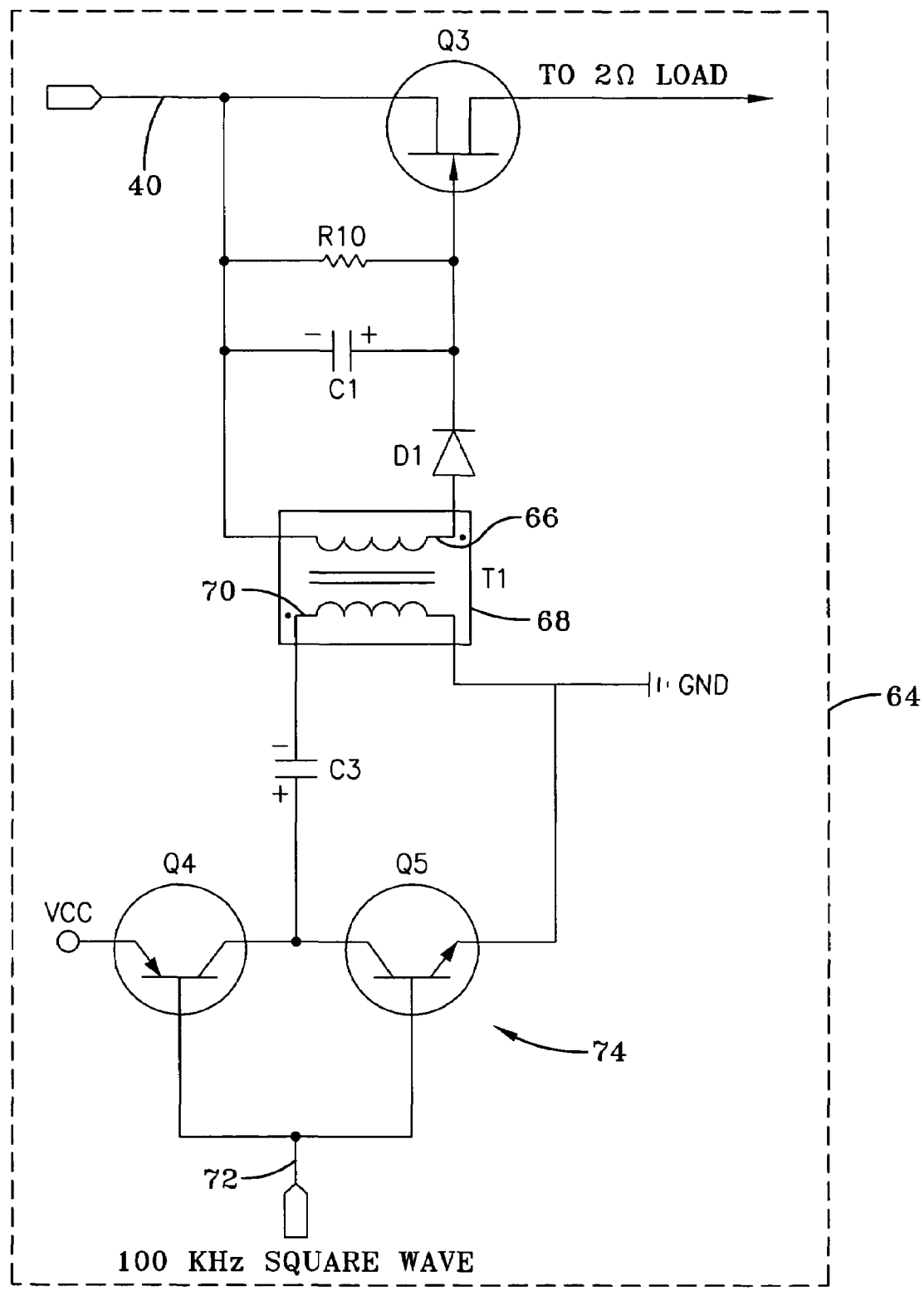
FIG. 2 is a schematic view of an alternative embodiment of a portion of the circuit of FIG. 1.
Figure 3:
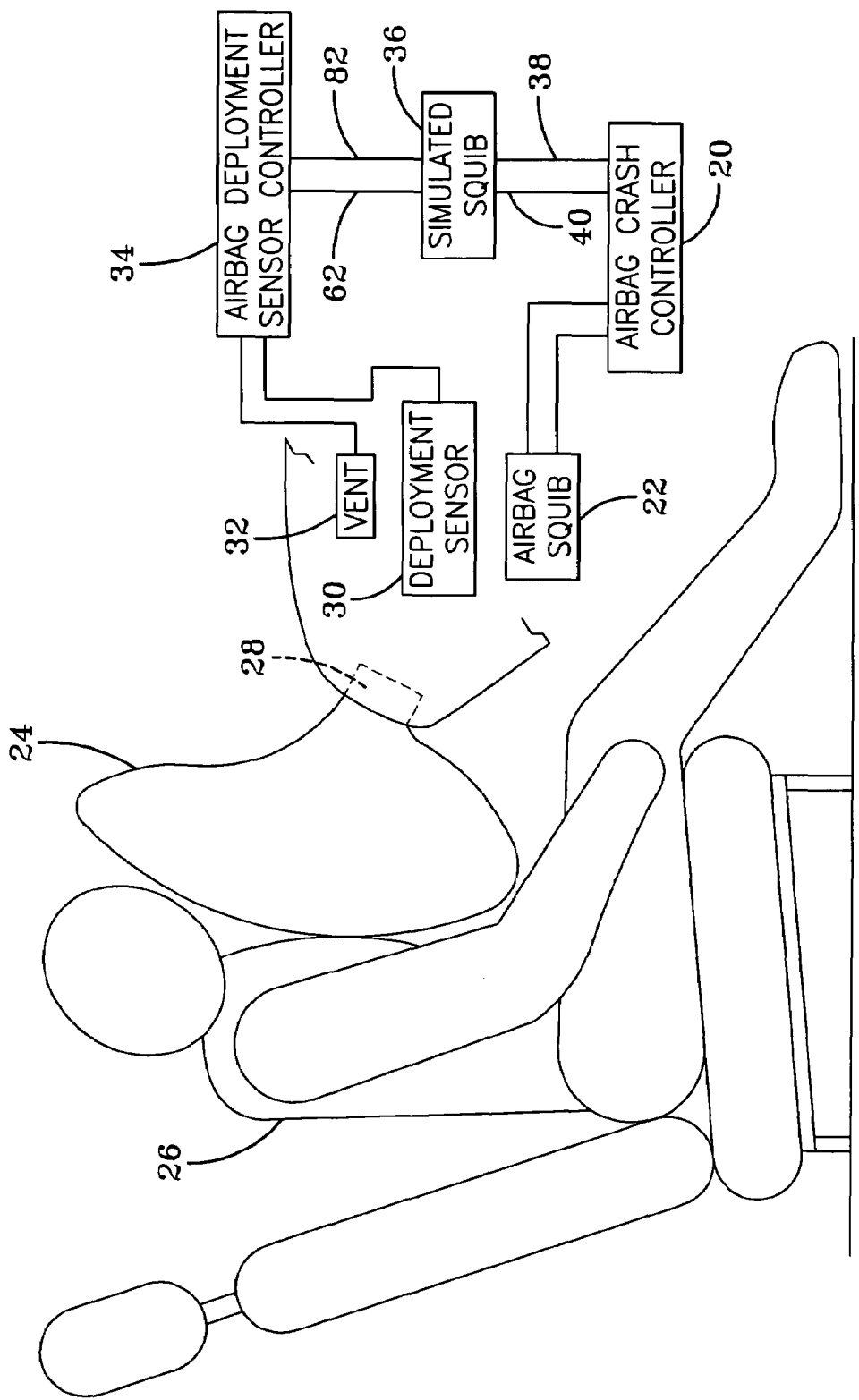
FIG. 3 is a schematic view of how the circuit of FIG. 1 is utilized in combination with an airbag crash controller.

Referring to FIGS. 1–3, wherein like numbers refer to similar parts, an airbag crash controller 20 is shown in FIG. 3. The airbag crash controller 20 is connected to an airbag deployment module 28 which has an airbag squib 22 which deploys an airbag 24 when needed to protect a vehicle occupant 26. The airbag deployment module 28 incorporates an airbag deployment sensor 30 the output of which is used to control a vent 32. The airbag sensor 30 senses some aspect of airbag deployment, and if the airbag sensor controller 34 determines that airbag deployment should be terminated, the airbag 24 is vented by opening the vent 32. A simulated airbag squib 36 is connected by a first line 38 and a second line 40 to the airbag crash controller 20. The simulated airbag squib 36 provides an interface between the airbag deployment sensor controller 34 and the airbag crash controller 20 without requiring any change in the functionality of the airbag crash controller 20.

The airbag crash controller 20 has two functions used by the simulated airbag squib 36. The first function is to periodically test the functionality of all squibs, real or simulated, by determining the resistance of each squib, which is nominally two ohms. If the resistance is substantially off nominal, the airbag associated with a particular squib is indicated by a warning light to be in need of maintenance. The second function that the airbag crash controller 20 performs is to send a current pulse to each airbag squib when the airbag crash controller determines an airbag should be deployed. The simulated squib 36 uses the first function to communicate a fault in the deployment sensor 30 or the airbag deployment sensor controller 34 to the airbag crash controller 20, by causing the simulated squib 36 to fail the periodic testing function. The simulated squib 36 uses the second function to derive a start signal from the airbag crash controller 20 which is transmitted to the airbag deployment sensor 30 or deployment sensor controller 34. Airbag modules often contain more than one squib which can be fired simultaneously to deploy the airbag. The simulated squib 36 is, for example, connected to be fired simultaneously with the airbag deployment squid 22. The squib fire current supplied to the simulated squib 36 is detected and sent as a signal to the airbag deployment sensor 30 or the airbag deployment controller 34.

An important requirement for the simulated squib 36 is that it does not cause any interference or fault in the airbag crash controller. This requirement is accomplished by isolating portions of the circuit 42 forming the simulated squib 36 that connect to the airbag deployment sensor controller 34. As shown in FIG. 1, the igniter of a squib is simulated by a resistive load 44 formed by resistors R4 and R3 of one ohm each, and having a combined nominal resistance of two ohms, and which are connected between the first airbag crash controller line 38 and the second airbag crash controller line 40.

A fault indicating circuit 45 sends a fault signal to the airbag crash controller 20. The fault indicating circuit 45 has a switch formed by a field effect transistor Q1 which is connected between the second or low side line 40 and the resistive load 44 so that the source of Q1 is connected to the second line 40 and the drain of Q1 is connected to the resistive load 44. The field effect transistor Q1 will preferably have an extremely low $R_{DS}(on)$, and a low drive requirement, for example, Fairchild part NDT 3055L may be used. The low on resistance means that when the field effect transistor Q1 is powered, the load across the first line 38 and the second line 40 will be substantially that of the resistive load 44.

The field effect transistor Q1 gate is connected to a photovoltaic isolator 46 such as, for example, Toshiba part number TLP191B. This type of optical isolator allows both signal and power to be transmitted between the first side 48 and the second side 50. The first side 48 of the optical isolator 46 comprises a photo-diode array 52, the anode of which is connected to form a first current loop 58 with the field effect transistor Q1 gate. Sufficient power can be transmitted between a light-emitting diode 54 and the photo-diode array 52 to turn on Q1. The cathode of the photo-diode array 52 is connected to the low side line 40. A resistor 56 is arranged within the optical isolator in parallel with the photo-diode array 52 to drain voltage from the transistor Q1 gate to assure rapid opening of the field effect transistor Q1 when the light-emitting diode 54 is turned off. The light-emitting diode 54 is part of a second current loop 60 between a voltage source VCC and GND and includes R2 with a nominal value of 180 ohms. A second field effect transistor Q2 with a very high transconductance and low input leakage such as, for example, Fairchild part 2N7002, is connected by the transistor's drain to the light-emitting diode 54 and with its source connected to ground through R1 with a nominal value of 100 Kohms.

A control signal source line 62 is connected to the gate of Q2 and controls the flow of current through the light-emitting diode 54. When Q2 is turned on by a control signal on line 62 the flow of current to ground through Q2 and the second current loop causes the light-emitting diode 54 to emit light which causes a current flow in the first current loop which turns on Q1. When Q1 is on and the airbag crash controller 20 tests the simulated squib 36, it detects the nominal resistive load 44 and does not indicate a fault. On the other hand, if Q1 is not turned on, an open circuit is seen and a fault is indicated. If power is not supplied to the voltage source VCC, or if no control signal is generated on line 62, then Q1 will not turn on, and no power will be transmitted to the photovoltaic isolator 46 and Q2 will remain off, thus without power or control signal a fault will be indicated to the airbag crash controller 20.

An alternative fault indicating circuit 64 is shown in FIG. 2. The alternative circuit 64 has a switching transistor Q3 similar to Q2 which, when turned on, does not indicate a fault but when turned off or not powered does indicate a fault. In the circuit 64 a first current loop connects to the base or gate of Q3 through a diode D1 to a first half 66 of a ferrite isolation transformer 68. The second half 70 of the isolation transformer 68 forms a second current loop electrically which includes a capacitor C3, the second current loop is isolated from the first current loop and is connected to pair of transistors Q4 and Q5 arranged between a voltage source VCC and ground GND. The pair of transistors Q4 and Q5 form an amplifier 74 that amplifies a 100 kHz square signal from a control signal line 72. In the alternative fault indicating circuit 64 when a signal is supplied from the deployment sensor controller 34 in the form of a 100 kHz square wave, the 100 kHz signal is amplified and drives an alternating current through one side 70 of the isolation transformer 68. An alternating voltage in the one side 70 of the isolation transformer 68 causes a flow of current through the second side 70 which is connected to a diode which rectifies the generated AC current. The rectified current is applied to the base or gate of Q3 turning the transistor switch on. A capacitor C1 smooths the voltage in the first current loop and a resistor R10 discharges voltage applied to the base or gate of Q3 to the low side line 40 when the transformer 68 is not energized.

The second function performed by a second part 41 of the circuit 42 is to supply an airbag deployment indicator signal to the airbag deployment sensor controller 34 when the airbag crash controller sends a squib initiation signal to the simulated squib 36. This second function is performed through an isolator 76 such as a photo isolator, as shown in FIG. 1 for example a Fairchild semiconductor 4N35.S. The isolator has a light-emitting diode 78 that is connected in parallel with the resistive load 44. When the current pulse is applied by the airbag crash controller to the resistive load 44, a greatly diminished pulse voltage is applied to the light-emitting diode 78 through resistors R5 and R6 which have a value of 100 ohms. A capacitor C2 of, for example, 0.47 microfarads, is connected in parallel across the resistive load 44 and between R5 and R6 to shunt high-frequency voltage variations, and a zener diode D1, such as a Vishay Semiconductors part No. BZT52C5V6 is also connected in parallel across the resistive load 44 and between R5 and R6 to control voltage variations.

The light-emitting diode 78 of the isolator 76 emits infrared light when a squib initiation current is applied to the resistive load 44. The infrared light interacts with the base of a silicon phototransistor 80 within the isolator 76, turning it on. The base is connected to ground GND through a resistor R7 of nominal value 1 Mohms. The phototransistor 80 collector is connected to voltage source VCC, through a resistor R8 with a nominal value of 2.2 Kohms and the emitter is connected to ground GND. An output signal line 82 is connected to the collector of the phototransistor 80 so that when the voltage source is switched to ground, the output signal line 82 goes low, providing a signal indicating that the airbag crash controller 20 has sent a squib initiation signal to the simulated squib 36. The output of the signal line 82 is supplied to the airbag deployment sensor controller 34.

It should be understood that the circuit 42 can be used with any electrical components which are used in association with an airbag, the circuit providing by way of the simulated squib 36 a fault indication to the airbag crash controller 20, from the electrical components, and then communicates to the electrical components a squib initiation signal from the airbag crash controller. The squib initiation signal from the airbag crash controller can be identical with or at a fixed time differential with respect to an airbag squib. Typically the circuit 42 will be used with airbag deployment sensors which sense airbag deployment and upon certain conditions vents an airbag, or otherwise modifies the deployment sequence of an airbag. Of course the circuit 42 can also be used with other known safety equipment, or later developed safe equipment which employs a squib initiated by the airbag crash controller 20. An airbag crash controller should be understood to include any vehicle mounted controller that initiates squibs forming part of the safety equipment of a vehicle.

It should be understood that when the first field effect transistor Q1 is off, the effect is that there is a substantially open circuit between the first line and the second line. However, the basic requirement is that the resistance be substantially greater than that a nominal squib; e.g.: if nominal squib resistance is two ohms resistance, "substantially greater" might include four or ten ohms, the requirement being that the simulated squib be out of spec and be detected as a fault by the airbag crash controller, and further and the fault be reported by the airbag crash controller to the vehicle occupant.

It should be understood that the invention is not limited to the particular construction and arrangement of parts herein illustrated and described, but embraces all such modified forms thereof as come within the scope of the following claims.

We claim:
1. A simulated airbag squib comprising:
a first airbag crash controller squib initiation line;
a second airbag crash controller squib initiation line;
a selected resistive load connected across the first line and the second line so as to simulate an airbag squib;
an electrical switch connected between the selected resistive load and said second line, so that when the switch is open a resistance between the first line and the second line due to said selected resistive load is substantially greater than a nominal resistance of the airbag squib;
a fault indicating circuit having a first isolator which has an input side and an output side, the fault indicating circuit having a current loop which includes the output side of the first isolator and supplies voltage from the fault indicating circuit to the electronic switch, and the fault indicating circuit having a current pathway between a voltage source and a ground which includes the input side of the first isolator and so the current pathway is electrically isolated from the current loop;
a control signal source in current controlling relation to the current path; and
a second circuit having a second isolator which has an input side and an output side, wherein the second isolator input side is connected in parallel to the selected resistive load and the second isolator output side is connected to a signal output line.

2. The simulated airbag squib of claim 1 wherein the first isolator is a photovoltaic isolator.

3. The simulated airbag squib of claim 2 wherein the electrical switch is a field effect transistor having a gate, and wherein the photovoltaic isolator comprises a light-emitting diode on the input side of the isolator and a series connected photodiode array on the output side of the isolator connected to the field effect transistor gate.

4. The simulated airbag squib of claim 1 wherein the second isolator is an optical isolator having a light-emitting diode forming the input side, and an output side formed by a phototransistor in light receiving relation to the light-emitting diode.

5. The simulated airbag squib of claim 4 wherein the phototransistor has a collector connected to a voltage source and an emitter connected to ground, and the output signal line is connected to the collector, so that when the voltage source is switched to ground, the output signal line goes low.

* * * * *